United States Patent
Arena

[11] Patent Number: 5,015,133
[45] Date of Patent: May 14, 1991

[54] UNIVERSAL NUT

[76] Inventor: Frank R. Arena, 6842 - 149th Pl. N., Palm Beach County Estates, Palm Beach Gardens, Fla. 33418

[21] Appl. No.: 509,099

[22] Filed: Apr. 16, 1990

[51] Int. Cl.⁵ .................................................. F16B 21/00
[52] U.S. Cl. ................................. 411/267; 411/267; 411/433
[58] Field of Search .......................... 411/265–268, 411/432, 433, 935, 935.1, 408, 402, 410, 930, 337, 360; 285/322, 323, 382.7; 403/368, 370, 371

[56] References Cited

U.S. PATENT DOCUMENTS

| | | | |
|---|---|---|---|
| 905,294 | 12/1908 | Groff | 411/935 X |
| 955,784 | 4/1910 | Forrey | 411/935 X |
| 1,015,746 | 2/1912 | Herzog | 411/930 X |
| 1,075,419 | 10/1913 | Hickerson | 411/935.1 X |
| 1,201,022 | 10/1916 | Conniff | 411/432 |
| 1,316,112 | 9/1919 | Schofield | 411/930 X |
| 2,177,800 | 10/1939 | Chapman | 411/265 |
| 2,816,472 | 12/1957 | Boughton | 411/432 |

FOREIGN PATENT DOCUMENTS

| | | | |
|---|---|---|---|
| 116503 | 2/1943 | Australia | 411/268 |
| 453386 | 12/1948 | Canada | 285/323 |
| 654278 | 4/1929 | France | 411/265 |
| 924788 | 9/1947 | France | 411/268 |
| 81356 | 11/1918 | Switzerland | 411/268 |
| 17305 | of 1909 | United Kingdom | 411/268 |
| 388859 | 3/1933 | United Kingdom | 285/323 |
| 591061 | 8/1947 | United Kingdom | 411/268 |

*Primary Examiner*—Rodney M. Lindsey
*Assistant Examiner*—Jerry Redman
*Attorney, Agent, or Firm*—Alvin S. Blum

[57] ABSTRACT

A universal compression nut fits on the threaded shaft of bolts, screws, studs and the like of different diameters and thread pitches. It slides into place without turning. It has two mating screw members that fit together and screw one into the other. These members have a central bore to receive the screw shaft. When the two members are screwed together movable inserts are forced by one member along sloping surfaces in the second member. This forces the inserts in against the threaded shaft. The inserts are soft enough that the threads on the shaft embed into the inserts forming matching threads. The nut now is rotated to apply tension to the threaded shaft.

18 Claims, 1 Drawing Sheet

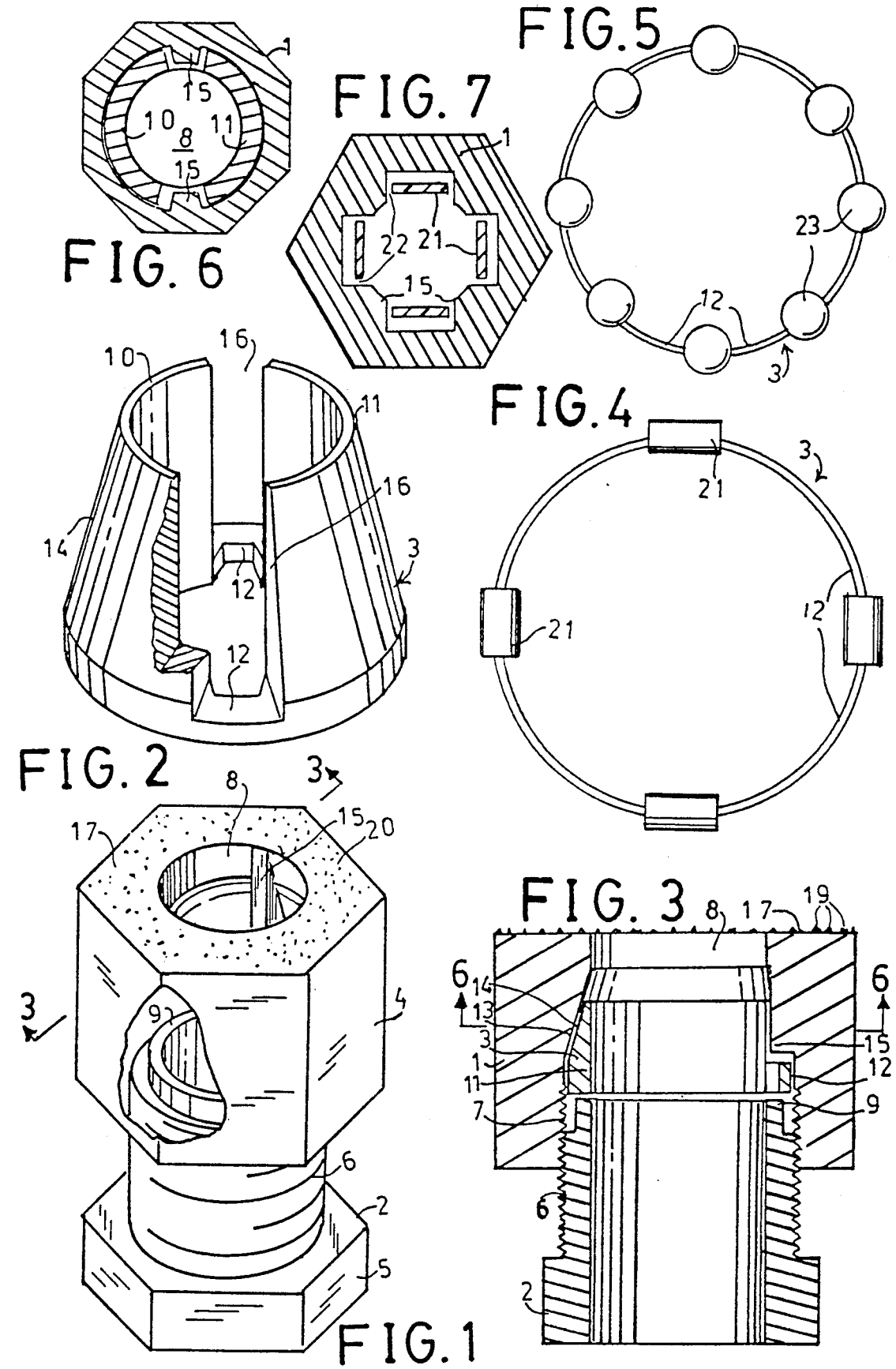

UNIVERSAL NUT

BACKGROUND OF THE INVENTION

This invention relates to fasteners and more particularly to a nut for a threaded fastener that slides over the threaded portion of a screw without rotation, engages the threads when in place and then behaves like an ordinary threaded nut to draw up tightly on the threaded portion when rotated.

To secure a screw or bolt with an ordinary nut, one must find a nut with a thread and diameter to match that of the bolt. The nut must then be correctly engaged on the thread and rotated all the way down until the bolt is drawn tight. In some situations it may be difficult to get the nut to correctly engage or "catch" the threads. If incorrectly engaged or "cross-threaded" the fastener threads may be so damaged that it is no longer possible to secure it with a conventional nut. If the threaded fastener is a stud on a machine, for example, the damage done by this simple error may be costly. And in some situations, screwing the nut all the way down on a long threaded shaft may be awkward and costly.

SUMMARY OF THE INVENTION

It is accordingly an object of the invention to provide a nut for engaging a threaded shaft that will fit shafts of different threads and diameters. It is another object of the invention to provide such a nut that will slide down over the threaded shaft without requiring rotation. It is yet another object to provide such a nut that will engage the threads of the threaded shaft when in place so that it may then be rotated to put tension on the shaft for tightening as desired. It is yet another object to provide such a nut that will function despite damage to the threads of the shaft.

The compression nut of the invention comprises a pair of cylindrical members having mating screw threads so that one may be screwed into the other, with both members having an axial bore large enough to admit the threaded fastener. A plurality of thread-engaging inserts are arranged about the bore in a space between the two members and held apart so as to provide clearance for the threaded fastener.

The inserts are held in place by collapsible spacing means. When one member is screwed into the other member, the inserts are pushed axially by one member against a sloping surface in the other member. This forces the inserts centripetally against the threads of the fastener. The inserts are softer than the fastener and the threads of the fastener press into and form threads in the inserts as the inserts are forced tightly against the fastener.

When this occurs, the nut is now a threaded nut that has a thread and inside diameter exactly matching that of the threaded fastener. It may now be rotated to apply tension to the fastener. It will work even with a damaged thread.

These and other objects, advantages and features of the invention will become more apparent when the detailed description is studied in conjunction with accompanying drawings.

BRIEF DESCRIPTION OF THE DRAWINGS

FIG. 1 is a perspective view of a compression nut of the invention with a portion of an outer member broken away and insert removed.

FIG. 2 is a perspective view of an insert with wedge jaws.

FIG. 3 is a cross sectional view taken on the line 3—3 of FIG. 1 with insert in place.

FIG. 4 is a top view of an insert with cylindrical jaws.

FIG. 5 is a top view of an insert with sperical jaws.

FIG. 6 is a cross sectional view taken on the line 6—6 of FIG. 3.

FIG. 7 is a cross sectional view as in FIG. 6 of a compression nut having the cylindrical jaw insert of FIG. 4.

DETAILED DESCRIPTION OF PREFERRED EMBODIMENTS

Referring now first to FIGS. 1, 2, 3 and 6, the compression nut of the invention comprises an outer member 1, an inner member 2 and an insert 3. Both members 1 and 2 have hexagonal outer surfaces 4, 5 for gripping with wrenches with 5 having a smaller size than 4 so that both may be gripped by nesting socket wrenches. Inner member 2 has a cylindrical projection with an external thread 6 that screws into the internal threaded portion 7 of the external member 1. Both members have a central bore 8 to permit the nut to be passed over the threaded shaft of a fastener. The insert 3 has an internal diameter at least as large as the central bore when held in place between the two members in the open mode ready for use as best shown in FIG. 3. As the inner member 2 is screwed into the outer member 1, ring 9 projecting from the end of member 2 pushes insert 3 axially. The insert 3 has two sloping jaws 10 and 11 joined at the base by flimsy connecting elements 12 that are strong enough to hold the jaws in position with open bore when no stress is applied but that yield readily when stress is applied. The inner surface of outer member 1 is especially constructed to retain the jaws of insert 3 and cause them to move inward toward the axis of the bore when inner member is screwed in. The inner surface of member 1 has an inwardly sloping surface 13 for interaction with the sloping surface 14 of the insert. As the insert is forced axially by ring 9 when the inner member is screwed in, the sloping surface 14 of each jaw 10, 11 of the insert is forced inward by sloping surface 13 of member 1. Centrally projecting ridges 15 of member 1 engage slots 16 in insert 3, prevent its rotation, and direct its axial movement. As the jaws 10, 11 move axially and centripetally (toward the center of the bore), the connecting elements yield, bend or break away. The insert, being of a softer material than the threaded fastener, is forced against the threads so that the threads embed or imprint their pattern into the inside surface of the jaws. When threads have been cut into the jaws by this action, the assembly can now function as a threaded nut. Rotation of the assembly will apply tension to the threaded shaft to pull the nut up tightly. The surface 17 of member 1 will be in contact with the surface from which the threaded shaft projects when the assembly is slipped onto the shaft. This surface may be provided with means to inhibit its rotation so that member 2 may be screwed in without having to hold member 1 against rotation. This friction increasing means may include projecting teeth or abrasive particles 19, pressure sensitive adhesive 20, or lock washers well known in the art.

The insert may take many forms, having two or more jaws with corresponding recesses in member 1 appropriately shaped to cooperate therewith. FIGS. 4 and 7 show a plurality of cylinders 21 in sloped recesses 22 formed by projections 15 from member 1. FIG. 5 shows an embodiment of the insert 3 having spheres 23 separated by flimsy connecting elements 12. The inserts may be made of a soft metal or plastic or other material as desired. It must be sufficiently soft relative to the threaded shaft that the threads are readily embossed into at least a portion of the jaws so that the nut may then be threadably engaged on the shaft and turned to pull tightly on the shaft. The jaws are suitably shaped to cooperate with the sloped surface of the recesses in a cam action to force them centripetally.

The nut assembly of the invention may be employed for firmly engaging shafts that do not have conventional threads if desired.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A universal, thread-forming nut assembly for engaging the threads of threaded shafts of different diameters and thread pitches, said nut assembly comprising:
   (a) a first member having a wrench-engaging outer surface, an axial bore of a diameter great enough to admit a threaded shaft, and two faces at right angles to the axis of said bore, an external face and an internal face, said internal face having an internally threaded cylindrical hole extending therefrom to a point intermediate said two faces, said hole being coaxial with, and of a diameter greater than said bore;
   (b) a second member having a wrench-engaging outer surface, an axial bore of a diameter great enough to admit said threaded shaft, two faces at right angles to the axis of said bore, an external face and an internal face, said internal face having a cylindrical portion extending therefrom and away from said external face, said cylindrical portion having an external thread corresponding to said internally threaded hole of said first member and arranged for cooperating therewith so that said cylindrical portion extends axially within said first member when said second member is rotated relative to said first member;
   (c) an insert including a plurality of jaw elements joined together by yieldable connecting means, said insert having an axial bore of a diameter great enough to admit said threaded shaft, said insert being held within said first member with an outer surface of said jaw elements engaging an inner surface of said first member, said inner surface having a cam shape for forcing said jaw elements centripetally when said insert is forced axially by contact with said cylindrical portion of said second member when said second member is screwed into said first member, said connecting means having sufficient rigidity to hold said jaw elements spaced apart before use and sufficiently yieldable to allow said jaw elements to move centripetally when forced axially; and
   (d) said jaw elements being soft enough to form threads upon being forced centripetally against said threaded shaft.

2. The assembly according to claim 1, in which said first member has longitudinal ridges extending radially from said inner surface toward said axis, said ridges separating said jaw elements one from another and preventing said insert from rotating within said first member when said cylindrical portion of said second member is forced against it.

3. The assembly according to claim 2, in which said jaw elements have substantially a wedge shape.

4. The assembly according to claim 2, in which said jaw elements have a substantially cylindrical shape.

5. The assembly according to claim 2, in which said jaw elements have a substantially spherical shape.

6. The assembly according to claim 2, in which said external face of said first member has a high friction surface to inhibit rotation when engaging another surface.

7. The assembly according to claim 6, in which said high friction surface includes an adhesive.

8. The assembly according to claim 6, in which said high friction surface includes abrasives.

9. The assembly according to claim 6, in which said high friction surface includes teeth.

10. A universal nut assembly for engaging shafts of different diameters, said nut assembly comprising;
    (a) a first member having a wrench-engaging outer surface, an axial bore of a diameter enough to admit a threaded shaft, and two faces at right angles to the axis of said bore, an external face and an internal face, said internal face having an internally threaded cylindrical hole extending therefrom to a point intermediate said two faces, said hole being coaxial with, and of a diameter greater than said bore;
    (b) a second member having a wrench-engaging outer surface, an axial bore of a diameter great enough to admit said shaft, two faces at right angles to the axis of said bore, an external face and an internal face, said internal face having a cylindrical portion extending therefrom and away from said external face, said cylindrical portion having an external thread corresponding to said internally threaded hole of said first member and arranged for cooperating therewith so that said cylindrical portion extends axially within said first member when said second member is rotated relative to said first member;
    (c) an insert including a plurality of jaw elements joined together by yieldable connecting means, said insert having an axial bore of diameter great enough to admit said shaft, said insert being held within said first member with an outer surface of said jaw elements engaging an inner surface of said first member, said inner surface having a cam shape for forcing said jaw elements centripetally when said insert is forced axially by contact with said cylindrical portion of said second member when said second member is screwed into said first member, said connecting means having sufficient rigidity to hold said jaw elements spaced apart before use and sufficiently yieldable to allow said jaw elements move centripetally when forced axially; and (d) said jaw elements being soft enough to conform to the shape of said shafts upon being forced centripetally against said shaft.

11. The assembly according to claim 10, in which said first member has longitudinal ridges extending radially from said inner surface toward said axis, said ridges separating said jaw elements one from another and preventing said insert from rotating within said first member when said cylindrical portion of said second member is forced against it.

12. The assembly according to claim 11, in which said jaw elements have substantially a wedge shape.

13. The assembly according to claim 11, in which said jaw elements have a substantially cylindrical shape.

14. The assembly according to claim 11, in which said jaw elements have a substantially spherical shape.

15. The assembly according to claim 11, in which said external face of said first member has a high friction surface to inhibit rotation when engaging another surface.

16. The assembly according to claim 15, in which said high friction surface includes an adhesive.

17. The assembly according to claim 15, in which said high friction surface includes abrasives.

18. The assembly according to claim 15, in which said high friction surface includes teeth.

* * * * *